United States Patent
Karasawa et al.

(10) Patent No.: US 6,700,905 B1
(45) Date of Patent: Mar. 2, 2004

(54) ULTRAWIDE-BAND LIGHT PULSE GENERATION

(75) Inventors: Naoki Karasawa, Sapporo (JP); Ryuji Morita, Sapporo (JP); Mikio Yamashita, Sapporo (JP)

(73) Assignee: Japan Science and Technology Corporation (JP)

( * ) Notice: Subject to any disclaimer, the term of this patent is extended or adjusted under 35 U.S.C. 154(b) by 0 days.

(21) Appl. No.: 10/069,730
(22) PCT Filed: Aug. 29, 2000
(86) PCT No.: PCT/JP00/05813
§ 371 (c)(1), (2), (4) Date: Feb. 28, 2002
(87) PCT Pub. No.: WO01/20396
PCT Pub. Date: Mar. 22, 2001

(30) Foreign Application Priority Data

Sep. 14, 1999 (JP) .......................... 11-259820

(51) Int. Cl.⁷ .................................. H01S 3/10
(52) U.S. Cl. ................ 372/21; 372/25; 372/29.015; 372/29.023
(58) Field of Search ............... 372/22, 25, 29.023, 372/29.015

(56) References Cited

U.S. PATENT DOCUMENTS 5,463,394 A * 10/1995 Sun ........................ 341/136
6,345,058 B1 * 2/2002 Hartemann et al. ........... 372/2

FOREIGN PATENT DOCUMENTS

| EP | 409660 | 1/1991 |
| JP | 3-65932 | 3/1992 |
| JP | 9-43653 | 2/1997 |
| JP | 10-83005 | 3/1998 |

OTHER PUBLICATIONS

Laser Kenkyu, vol. 23, No. 11, Nov. 1995, pp. 936–944.
Optics Letters, vol. 22, No. 17, Sep. 1, 1997, pp. 1335–1337.

* cited by examiner

*Primary Examiner*—Leon Scott, Jr.
(74) *Attorney, Agent, or Firm*—Lorusso, Loud & Kelly

(57) ABSTRACT

A method of generating light pulses in an ultrawide band ranging from the near-infrared region to the near-ultraviolet region. Fundamental sub-picosecond pulses emitted from an ultrashort pulse laser (1) are passed through a nonlinear optical material (6) to produce wavelength-converted pulses whose center wavelength differs from that of the fundamental pulses. The method comprises the steps of separating the converted pulses from the fundamental pulses, delaying the converted pulses relative to the fundamental pulses, adjusting the polarization of the converted or fundamental pulses, adjusting the energy of the fundamental and converted pulses, superposing the separated fundamental and converted pulses on each other, and allowing the superimposed pulses to pass through a nonlinear optical material (22).

9 Claims, 3 Drawing Sheets

ULTRAWIDE-BAND LIGHT PULSE GENERATION

This application is a National Phase Application (35USC 371) of PCT/JP/00/05813 and claims priority of Japanese Application No. 11-259820 filed Sep. 14, 1999.

TECHNICAL FIELD

The present invention relates to a method of generating light pulses in an ultrawide band ranging from the near-infrared region to the near-ultraviolet region, through utilization of interaction between laser light pulses and a nonlinear optical material.

BACKGROUND ART

Conventionally, widening of the spectrum of light pulses has been achieved through an operation of passing a single light pulse train having a predetermined center wavelength through a nonlinear optical material.

This method utilizes the self phase modulation effect, such that the refraction index of a nonlinear optical material changes with the intensity of the pulse train itself, and thus, the phase of the pulse train is modulated.

The frequency band of 230 THz (wavelength: 600 nm to 1100 nm) has been used in both the case in which a quartz fiber is used [A. Baltuska, Z. Wei, M. S. Pshenichnikov, D. A. Wiersma, and R. Szipocs, Appl. Phys, B65, 175 (1997)] and in the case in which a hollow glass fiber filled with rare gas such as argon or krypton is used [M. Nisoli, S. Stagira, S. De Silvestri, O. Svelto, S. Sartania, Z. Cheng, M. Lenzner, Ch. Spielmann, and F. Krausz, Appl. Phys, B65, 189 (1997)].

DISCLOSURE OF THE INVENTION

When the spectrum band is widened beyond the above-described band by the above-described conventional methods utilizing self phase modulation only, the intensity of light pulses must be increased beyond a damage limit of a nonlinear optical material used, raising the problem of damage being inflicted on the medium. Therefore, widening of the spectrum band has been difficult to achieve.

An object of the present invention is to solve the above-described problem and to provide an ultrawide-band light pulse generation method of generating light pulses in an ultrawide band ranging from the near-infrared region to the near-ultraviolet region.

In order to achieve the above object, the present invention provides the following.

[1] A method of generating light pulses in an ultrawide band, the method comprising the steps of: causing an ultrashort pulse laser serving as a light pulse source to emit sub-picosecond light pulses (hereinafter referred to as "fundamental pulses"); passing the fundamental pulses through at least one nonlinear optical material in order to obtain light pulses having a center wavelength different from that of the fundamental pulses (hereinafter referred to as "wavelength-converted pulses"); separating the wavelength-converted pulses from the fundamental pulses; delaying the wavelength-converted pulses relative to the fundamental pulses; adjusting the polarization of the wavelength-converted pulses or the fundamental pulses; adjusting the energy of the fundamental pulses and the energy of the wavelength-converted pulses; superposing the separated fundamental and wavelength-converted pulses on each other; and causing the superimposed pulses to enter, propagate through, and exit a nonlinear optical member.

[2] A method of generating light pulses in an ultrawide band according to [1], wherein the wavelength-converted pulses are generated from the fundamental pulses by sole or combined use of optical parametric oscillation-amplification, stimulated Raman scattering, stimulated Brillouin scattering, and single-filament continuous wave generation, all of which involve harmonic generation, sum frequency generation, and difference frequency generation.

[3] A method of generating light pulses in an ultrawide band according to [1], wherein the wavelength-converted pulses are generated from a laser having a resonator independent of that of the laser used for generation of the fundamental pulses; and feedback control is effected to maintain a constant relative phase difference between the fundamental pulses and the wavelength-converted pulses.

[4] A method of generating light pulses in an ultrawide band according to [1], wherein in the final step of introducing the fundamental pulses and the wavelength-converted pulses into the nonlinear optical member to thereby superimpose them together, the fundamental pulses and the wavelength-converted pulses are superimposed on each other in the vicinity of the terminal end of a waveguide path of the nonlinear optical member.

[5] A method of generating light pulses in an ultrawide band according to [1], wherein the wavelength-converted pulses are second-harmonic pulses which are obtained through passage of the fundamental pulses through the nonlinear optical material.

[6] A method of generating light pulses in an ultrawide band according to [1], wherein the source of the fundamental pulses is a fiber laser, a semiconductor laser, a solid-state laser, or a combination of one of these lasers and an amplification system.

[7] A method of generating light pulses in an ultrawide band according to [1], wherein the nonlinear optical member through which the fundamental pulses and the wavelength-converted pulses propagate in the final step is an optical fiber selected from the group of consisting of quartz fiber, organic fiber, and polymer fiber.

[8] A method of generating light pulses in an ultrawide band according to [1], wherein the nonlinear optical member through which the fundamental pulses and the wavelength-converted pulses propagate in the final step is a hollow fiber filled with a gas.

[9] A method of generating light pulses in an ultrawide band according to [1], wherein the nonlinear optical member through which the fundamental pulses and the wavelength-converted pulses propagate in the final step is an optical modulation member having nonlinear optical characteristics which assumes the form of bulk, thin layer, film, or photonic crystal structure.

BEST MODE FOR CARRYING OUT THE INVENTION

Figure 1:
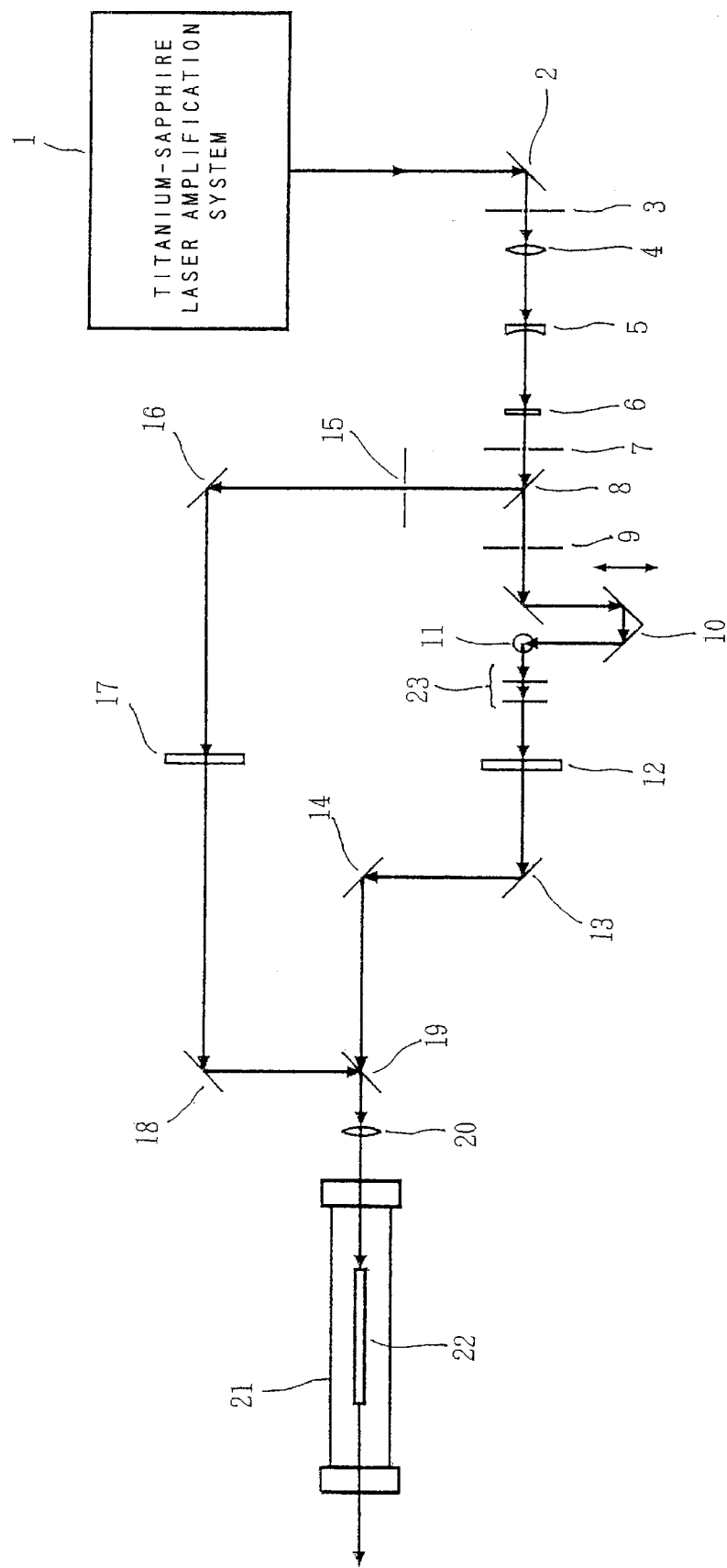
FIG. 1 is a structural view showing the optical system of an ultrawide-band light pulse generator according to an embodiment of the present invention.

A mode of the present invention will next be described.

The present invention utilizes the inductive phase modulation effect, which can be observed when at least two light pulse trains having different center wavelengths are passed through a nonlinear optical member and in which the phase of a light pulse train is modulated through variation in the refraction index of the medium caused by variation in the intensity of other pulse trains.

The present invention premises use of light pulse trains which have different center wavelengths and spectrum bands widened in the vicinity of the center wavelengths through self phase modulation. The widening of the spectrum bands occurs not only due to self phase modulation but also due to inductive phase modulation, depending on inter-pulse delay time, and thus, the spectrums of the two pulse trains can be superimposed on each other.

In the present invention, since improved phase modulation efficiency eliminates the necessity of increasing the light intensity to or beyond a level at which a medium is damaged, a light pulse train having a very wide spectral band can be produced without involvement of the problem of damage being inflicted on the medium.

The above-described at least two light pulse trains having different center wavelengths can be obtained in the following manner. Fundamental pulses emitted from a laser light source and having a predetermined center wavelength are passed through a nonlinear optical material (element) so as to produce converted pulses having a converted center wavelength. The fundamental pulses and the converted pulses having the converted center wavelength are separated from each other in such a manner that the fundamental pulses and the converted pulses propagate along different optical paths. At this time, a plurality of pulse trains having different center wavelengths may be used through use of a plurality of nonlinear optical materials.

For generation of the converted pulses, various methods known in this technical field can be employed. Examples of such methods include parametric amplification-oscillation, stimulated Raman scattering, stimulated Brillouin scattering, and single-filament continuous wave generation, all of which involve harmonic generation, sum frequency generation, and difference frequency generation.

Meanwhile, there has been known a method in which at least two independent semiconductor lasers having different center frequencies are operated, their longitudinal-mode frequencies are monitored, and are the lasers are feed-back controlled in such a manner that the beat frequency therebetween is maintained constant to thereby maintain a constant relative phase difference between the lasers. One of the semiconductor lasers can be used as a light source for generating fundamental pulses, and the other semiconductor laser can be used as a light source for generating pulses having a converted frequency.

In the most preferable embodiment of the present invention, second harmonic pulses, which can be obtained by passage of fundamental pulses through a nonlinear optical material, are used as light pulses having a converted wavelength. While the fundamental pulses and the second harmonic pulses are propagating along separate optical paths, the delay times, polarization directions, and pulse energies of the fundamental and second harmonic pulses are adjusted. Subsequently, the fundamental and second harmonic pulses are caused to enter a common nonlinear optical member, propagate along the member, and exit the member. Thus, the spectral band can be widened greatly.

In order to enable compression or waveform shaping of the thus-obtained ultrawide-band light pulses, phase change must be guaranteed not to occur randomly at each frequency.

One feature of the present invention resides in that in order to achieve the above, all light pulses that enter the nonlinear optical member are generated from the same fundamental pulses. Since the fundamental pulses and the wavelength-converted pulses have a constant phase relationship therebetween, two pulse trains which have exited the nonlinear optical member and have widened spectral bands also have a constant phase relationship therebetween. Therefore, even when these pulse trains are superimposed, the phase of the resultant pulses does not change randomly.

For effective utilization of inductive phase modulation, the delay times of the fundamental and second harmonic pulses to be introduced to a nonlinear optical member must be adjusted in such a manner that the two pulse trains overlap each other within a waveguide path. In particular, in order to achieve spectral overlap to a larger degree in an ultrawide band, an important requirement is that the fundamental and second harmonic pulses be caused to overlap in the vicinity of the terminal end of the nonlinear optical member.

Many inorganic and organic members which are known in the present technical field and have high third-order optical non-linearity can be used as a nonlinear optical member. The nonlinear optical member may assume the form of a waveguide, bulk, thin film, or photonic crystal.

In the most preferred embodiment, a hollow glass fiber filled with rare gas such as argon is used as a nonlinear optical member.

Since rare gas has a high resistance to power-induced damage, and the hollow fiber configuration enables confinement of light within a small volume to thereby increase the power density of light pulses, the phase modulation efficiency can be improved.

Generation of mono-cycle light pulses becomes possible through control of phase of ultrawide-band light pulses and compression of pulse time width. Further, through multi-wavelength waveform shaping, new optical applications become possible; e.g., obtainment of a light source for generating a plurality of synchronized pulse trains whose wavelengths can be controlled individually.

Next, the present invention will be described with reference to an embodiment.

FIG. 1 is a structural view showing the optical system of an ultrawide-band light pulse generator according to an embodiment of the present invention.

In FIG. 1, reference numeral 1 denotes a titanium-sapphire laser amplification system (unit for generating pulses having an ultra narrow pulse width of 1 picosecond or less); 2, 13, 14, and 18 each denote a reflection mirror; 3, 7, 9, and 15 each denote a slit; 4 denotes a convex lens; 5 denotes a concave lens; 6 denotes a non-linear optical crystal β-barium borate (BBO) serving as a nonlinear optical material: 8 and 16 each denote a harmonic separator (HS); 10 denotes a Littrow reflector (RR); 11 denotes a polarization rotator (PR), 23 denotes a periscope (PS); 12 and 17 each denote a variable neutral density filter (VND); 19 denotes a dichroic mirror (DM); 20 denotes a lens; 21 denotes a pressure-resistant chamber; and 22 denotes a hollow fiber of quartz glass serving as a nonlinear optical material.

As shown in FIG. 1, light pulses (center wavelength: 790 nm, pulse width: 30 fs, pulse energy: 0.6 mj, repetition frequency: 1 kHz) generated by the titanium-sapphire laser amplification system 1 are passed through the non-linear optical crystal β-barium borate (BBO) 6 having a thickness of 0.5 mm, in order to generate second harmonic pulses (center wavelength: 395 nm).

The second harmonic pulses are separated from fundamental pulses by means of the harmonic separators (HS) 8 and 16, which reflect only optical waves having the same wavelength as that of the second harmonic pulses. The fundamental pulses are delayed by a predetermined delay time by means of the Littrow reflector (RR) 10, which is composed of three mirrors and adapted to form a roundabout optical path, and by means of the polarization rotator (PR) 11 composed of two mirrors are caused to have the same polarization direction as that of the second harmonic pulses. Further, the height of the optical path is adjusted by use of the periscope (PS) 23 composed of two mirrors. The fundamental and second harmonic pulses are superimposed on each other by means of the dichroic mirror (DM) 19, which reflects the second harmonic pulses and permits passage of the fundamental pulses therethrough.

By use of the lens 20 having a focal distance of 20 cm, the fundamental and second harmonic pulses are focused at the incident end of the hollow quartz-glass fiber 22 (internal diameter: 0.1 mm, length: 30 cm), which is placed in the pressure-resistant chamber 21, which is filled with argon of 3.3 atm and which has incoming and outgoing windows formed of sapphire, so that the fundamental and second harmonic pulses propagate along the quartz-glass fiber 22 while being guided thereby.

At this time, the incident pulse energies of the fundamental and second harmonic pulses are adjusted by means of the variable neutral density filters (VND) 12 and 17. In an experiment, the fundamental pulses had a pulse energy of 1.9 GW (72 μJ) and a pulse width of 38 fs; and the second harmonic pulses had a pulse energy of 1.0 GW (70 μJ) and a pulse width of 67 fs.

Figure 2:
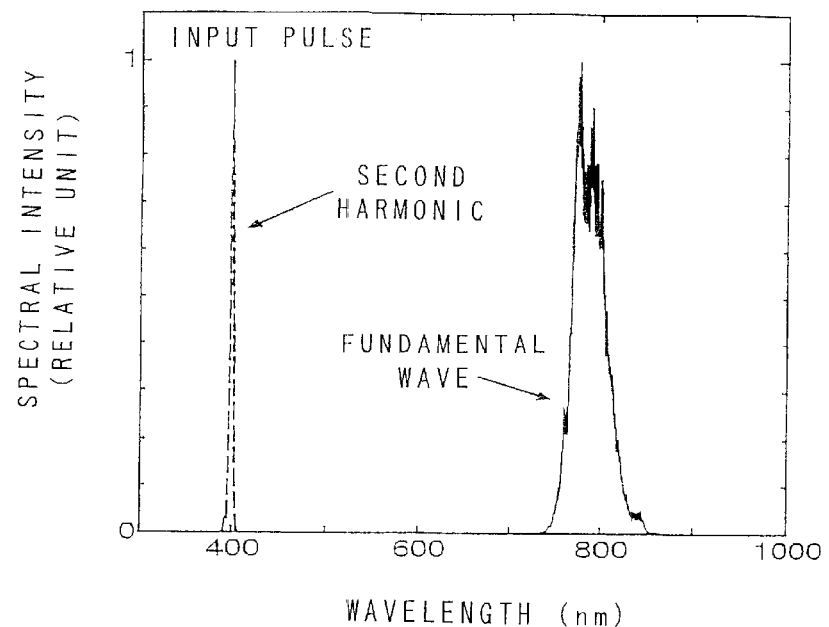
FIG. 2 is a graph showing a spectrum (incoming pulse spectrum) of pulses as measured at an incident end of a fiber in the embodiment of the present invention.

FIG. 2 shows the spectrum of pulses as measured at the incident end of the fiber 22.

Figure 3:
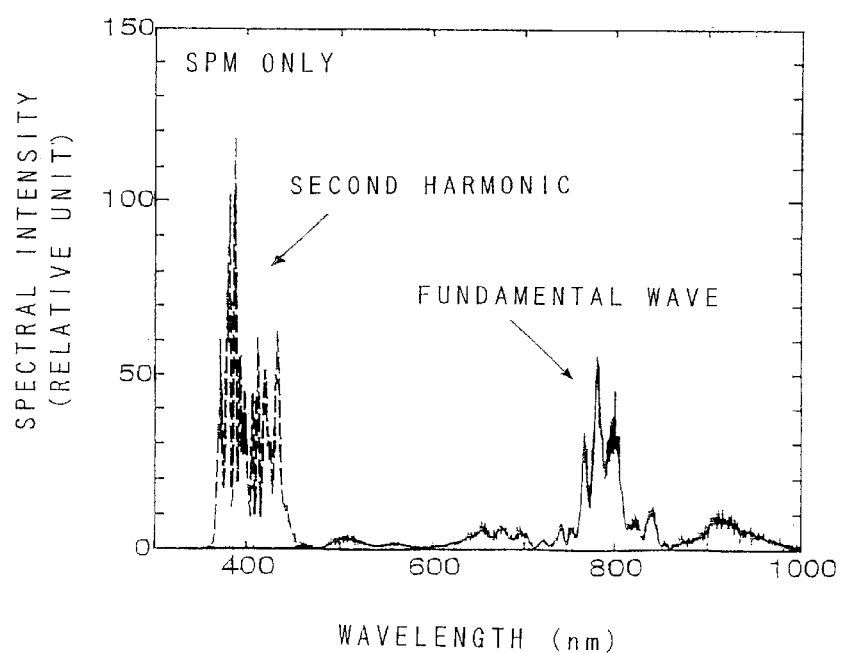
FIG. 3 is a graph showing an outgoing pulse spectrum obtained through self phase modulation only.

When the fundamental pulses and the second harmonic pulses are individually introduced to the fiber 22, spectrums as shown in FIG. 3 were observed at the outgoing end of the fiber 22. That is, although widening of the spectrums due to self phase modulation was observed, not much overlap between the spectrums was observed. When the delay time of the fundamental pulses relative to the second harmonic pulses is adjusted such that their spectrums overlap in the vicinity of the terminal end of the fiber 22, as shown in FIG. 4, ultrawide-band light pulses (band width: 620 THz (325 nm to 1000 nm), pulse energy: 28 μJ) were generated.

Figure 4:
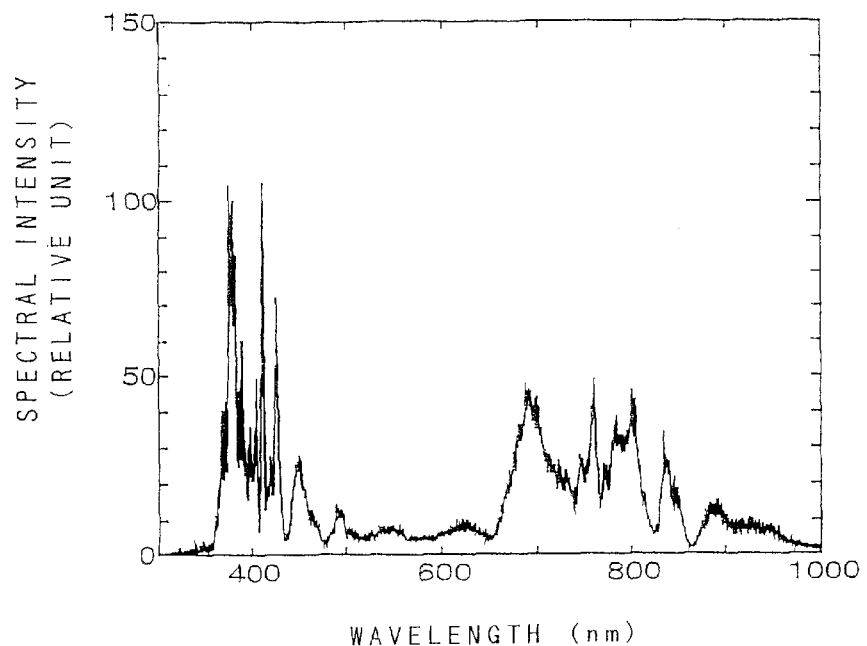
FIG. 4 is a graph showing an outgoing pulse spectrum obtained by use of the ultrawide-band light pulse generator of the present invention.
Figure 5:
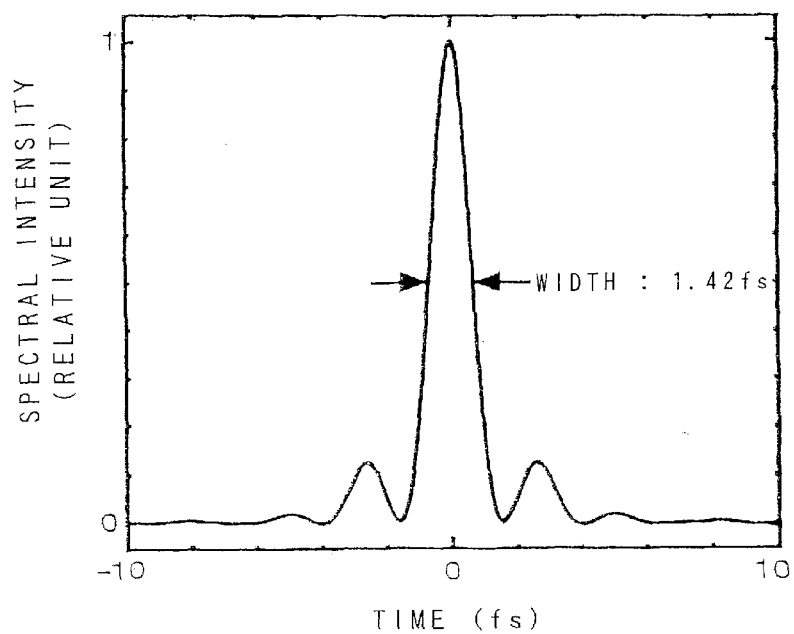
FIG. 5 is a graph showing a compressed pulse waveform which is obtained from the pulse shown in FIG. 4 through complete phase compensation.

Comparison of the spectrum of FIG. 4 with the spectrum of FIG. 3 reveals that the degree of spectral overlap increases greatly due to the effect of inductive phase modulation. Calculation reveals that when the generated light pulses are compressed through complete alignment of frequency phases of the pulses, light pulses having a pulse width of 1.42 fs are generated. Notably, FIG. 5 shows a waveform of a compressed pulse which is obtained from the pulse shown in FIG. 4 through complete phase compensation.

The present invention is not limited to the embodiments described above. Numerous modifications and variations of the present invention are possible in light of the spirit of the present invention, and they are not excluded from the scope of the present invention.

As have been described in detail, the present invention provides the following advantageous effects.

Use of inductive phase modulation enables generation of quasi-linear chirped light pulses in an ultrawide band ranging from the near-infrared region to the near-ultraviolet region, which has been difficult to attain by use of the conventional self phase modulation only. The ultrawide-band light pulse generation method can be used for generation of mono-cycle pulses, multi-wavelength synchronized waveform shaping, etc. Thus, the present invention can be applied to chemical reaction control, creation of new substances, molecular function control, and molecular diagnosis/treatment.

Further, the present invention can be applied to optical information transmission processing and optical computers which utilize time-wavelength multiplexing and temporal parallel control, and therefore has a high industrial value.

INDUSTRIAL APPLICABILITY

The ultrawide-band light pulse generation method of the present invention can be applied to generation of mono-cycle pulses and multi-wavelength synchronized waveform shaping. Therefore, conceivably the present invention can be applied to chemical reaction control, creation of new substances, molecular function control, and molecular diagnosis/treatment, as well as to optical information transmission processing in time-wavelength multiplexing and space parallel control.

What is claimed is:

1. A method of generating light pulses in an ultrawide band, in which sub-picosecond fundamental pulses emitted from an ultrashort pulse laser is passed through a nonlinear optical material in order to produce at least one type of wavelength-converted pulses having a center wavelength different from that of the fundamental pulses, an intensity substantially equal to that of the fundamental pulses, and a constant phase difference relative to the fundamental pulses; and the wavelength-converted pulses and the fundamental pulses are used to generate light pulses, the method comprising the steps of:

(a) separating the wavelength-converted pulses from the fundamental pulses;

(b) delaying the wavelength-converted pulses relative to the fundamental pulses;

(c) adjusting the polarization of the wavelength-fundamental pulses or the converted pulses (d) adjusting the energy of the fundamental pulses and the energy of the wavelength-converted pulses;

(e) superposing the separated fundamental and wavelength-converted pulses on each other; and (f) mixing the fundamental pluses and the wavelength-converted pulses in an electric field when the fundamental pluses and the wavelength-converted pulses enter, propagate through, and exit a nonlinear optical member after being modulated, whereby (g) light pulses which enable phase control of respective frequency components and pulse compression are generated through simultaneous utilization of self phase modulation and inductive phase modulation caused by interaction between the fundamental pluses and the wavelength-converted pulses.

2. A method of generating light pulses in an ultrawide band according to claim 1, wherein the wavelength-converted pulses are generated from the fundamental pulses by sole or combined use of optical parametric oscillation-amplification, stimulated Raman scattering, stimulated Brillouin scattering, and single-filament continuous wave generation, all of which involve harmonic generation, sum frequency generation, and difference frequency generation.

3. A method of generating light pulses in an ultrawide band according to claim 1, wherein the wavelength-converted pulses are generated from a laser having a resonator independent of that of the laser used for generation of the fundamental pulses; and feedback control is effected to maintain a constant relative phase difference between the fundamental pulses and the wavelength-converted pulses.

4. A method of generating light pulses in an ultrawide band according to claim 1, wherein in the step (f) of introducing the fundamental pulses and the wavelength-converted pulses into the nonlinear optical member to thereby superimpose them together, the fundamental pulses and the wavelength-converted pulses are superimposed on each other in the vicinity of the terminal end of a waveguide path of the nonlinear optical member.

5. A method of generating light pulses in an ultrawide band according to claim 1, wherein the wavelength-converted pulses are second-harmonic pulses which are obtained through passage of the fundamental pulses through the nonlinear optical material.

6. A method of generating light pulses in an ultrawide band according to claim 1, wherein the source of the fundamental pulses is a fiber laser, a semiconductor laser, a solid-state laser, or a combination of one of these lasers and an amplification system.

7. A method of generating light pulses in an ultrawide band according to claim 1, wherein the nonlinear optical member through which the fundamental pulses and the wavelength-converted pulses propagate in the step (f) is an optical fiber selected from the group of consisting of quartz fiber, organic fiber, and polymer fiber.

8. A method of generating light pulses in an ultrawide band according to claim 1, wherein the nonlinear optical member through which the fundamental pulses and the wavelength-converted pulses propagate in the step (f) is a hollow fiber filled with a gas.

9. A method of generating light pulses in an ultrawide band according to claim 1, wherein the nonlinear optical member through which the fundamental pulses and the wavelength-converted pulses propagate in the step (f) is an optical modulation member having nonlinear optical characteristics which assumes the form of bulk, thin layer, film, or photonic crystal structure.

* * * * *